United States Patent
Mendenhall et al.

(10) Patent No.: US 10,110,887 B2
(45) Date of Patent: Oct. 23, 2018

(54) DISPLAY DIAGNOSTICS FOR ENHANCING PERFORMANCE OF DISPLAY DEVICES

(71) Applicant: ROKU, INC., Los Gatos, CA (US)

(72) Inventors: David Mendenhall, Los Gatos, CA (US); Jason Silver, Sunnyvale, CA (US); Wade Brown, Los Gatos, CA (US); Lloyd Klarke, Los Gatos, CA (US); Sukh Gosal, Los Gatos, CA (US); Ali Vassigh, Los Gatos, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/465,147

(22) Filed: Mar. 21, 2017

(65) Prior Publication Data

US 2018/0278926 A1    Sep. 27, 2018

(51) Int. Cl.
*H04N 17/00* (2006.01)
*H04N 17/02* (2006.01)
*G06F 3/0482* (2013.01)

(52) U.S. Cl.
CPC ......... *H04N 17/004* (2013.01); *G06F 3/0482* (2013.01)

(58) Field of Classification Search
CPC ............ H04N 17/00; H04N 21/43635; H04N 21/4425; H04N 21/443
USPC ..... 348/180, 181, 192, 189; 455/423, 226.1, 455/115.1; 375/224; 725/107
See application file for complete search history.

(56) References Cited

U.S. PATENT DOCUMENTS

2012/0327250 A1* 12/2012 Zhang .................... G09G 5/006
348/180

* cited by examiner

*Primary Examiner* — Michael Teitelbaum
*Assistant Examiner* — Jean W Desir
(74) *Attorney, Agent, or Firm* — Sterne, Kessler, Goldstein & Fox P.L.L.C.

(57) ABSTRACT

This disclosure is generally directed to a system and method for diagnosing display capabilities, such as resolution, frame rate, and content protection, of display devices and improving the performance of the display devices by optimizing the display settings based on the results of the diagnosing. Display diagnostics receives information from display devices in response to tests performed on the display devices. The display diagnostics analyzes the information and provides recommended display settings related to the display device for optimizing the display of video content on the display device.

20 Claims, 5 Drawing Sheets

DISPLAY DIAGNOSTICS FOR ENHANCING PERFORMANCE OF DISPLAY DEVICES

BACKGROUND

Field

This disclosure is generally directed to diagnosing display capabilities, such as resolution, frame rate, and content protection, of display devices and enhancing the performance of the display devices by improving the display settings based on the results of the diagnosing.

Background

With the emergence of 4K and 4K HDR video content, consumers face a dizzying array of technology (and acronyms) in display devices advertised as compatible with such video content. These devices may have different types of connections (e.g., high-definition multimedia interface (HDMI)) that have different versions (e.g., HDMI 1.4 or HDMI 2.0) and different protocols (e.g., high-bandwidth digital content protection (HDCP)) that also have different versions (e.g., HDCP 1.4 or HDCP 2.2). Consumers who purchase the latest devices, such as the latest televisions, to display 4K content may expect the devices to begin displaying 4K or 4K HDR video straight of the box. However, there are a number of variables that may impact the consumer's ability to enjoy such content. For example, devices do not necessarily have the same inputs and outputs. Some inputs may support 4K video only, others may support both 4K and 4K HDR video, and others may not support either resolution. Other inputs, such as a high-definition multimedia interface (HDMI) port, may have different versions with different capabilities. For example, HDMI 1.4 may support 4K video, but may be limited to displaying such content at 30 frames per second where HDMI 2.0 supports 4K video at 60 frames per second. Other ports may employ different firmware versions of standards, such as high-bandwidth digital content protection (HDCP), which is a protocol for protecting video content. 4K content requires at least a HDCP 2.2 port and is not compatible with an older generation HDCP 1.4 port.

Compounding this problem are the proliferating number of content devices that may be connected within a user's entertainment ecosystem. Cable set-top boxes, media streaming devices, gaming devices, and audio players must also be compatible with the television's inputs and outputs in order to properly play 4K and 4K HDR content. Currently, prior art media devices do not process available information, such as the capabilities of a display device, and aid consumers with regard to the settings and configurations of such devices. More than ever, consumers need assistance to optimize the settings of their devices to improve performance of their devices.

SUMMARY

Provided herein are system, apparatus, article of manufacture, method and/or computer program product embodiments, and/or combinations and sub-combinations thereof, for using technology in innovative ways to provide enhanced media streaming functionality.

An embodiment is directed to system, apparatus, article of manufacture, method and/or computer program product embodiments, and/or combinations and sub-combinations thereof, for detecting the display capabilities of a display device and utilizing the detected capabilities to perform certain actions such as providing recommended display settings for the display device in an automated manner. In a non-limiting embodiment, the apparatus may be a media streaming device, and the display settings may relate to the display device's capability in displaying 4K video content. The apparatus includes a memory having display diagnostic code stored therein. The apparatus includes a processor that is communicatively coupled to the memory. When the apparatus executes the code, the processor initiates display diagnostics to detect the display settings of the apparatus or of a connected display device. In operation, in some embodiments, the apparatus may have a display. In other embodiments, the apparatus may be connected to a display device. Display diagnostics detects display settings related to the display device's capability of displaying certain video content. The apparatus receives these capabilities, processes the information, and provides information to the user, recommended display settings, and/or actions that the user may perform to improve the display.

Another embodiment is directed to system, apparatus, article of manufacture, method and/or computer program product embodiments, and/or combinations and sub-combinations thereof, for detecting the display capabilities of a display device and utilizing the detected capabilities to perform certain actions such as verifying a user's selection of display settings and providing recommended display settings for the display device in response to the user's selection of display settings. In a non-limiting embodiment, the apparatus may be a media streaming device, and the display settings may relate to the display device's capability in displaying 4K video content. The apparatus includes a memory having display diagnostic code stored therein. The apparatus includes a processor that is communicatively coupled to the memory. When the apparatus receives the user's selection of a display setting, the apparatus executes the code to initiate display diagnostics for verifying the user's selection. Verifying the selection may include detecting the display settings of the apparatus or of a connected display device. Display diagnostics detects display settings related to the display device's capability of displaying certain video content. The apparatus receives these capabilities, processes the information, and provides information to the user, recommended display settings, and/or actions that the user may perform to improve the display.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
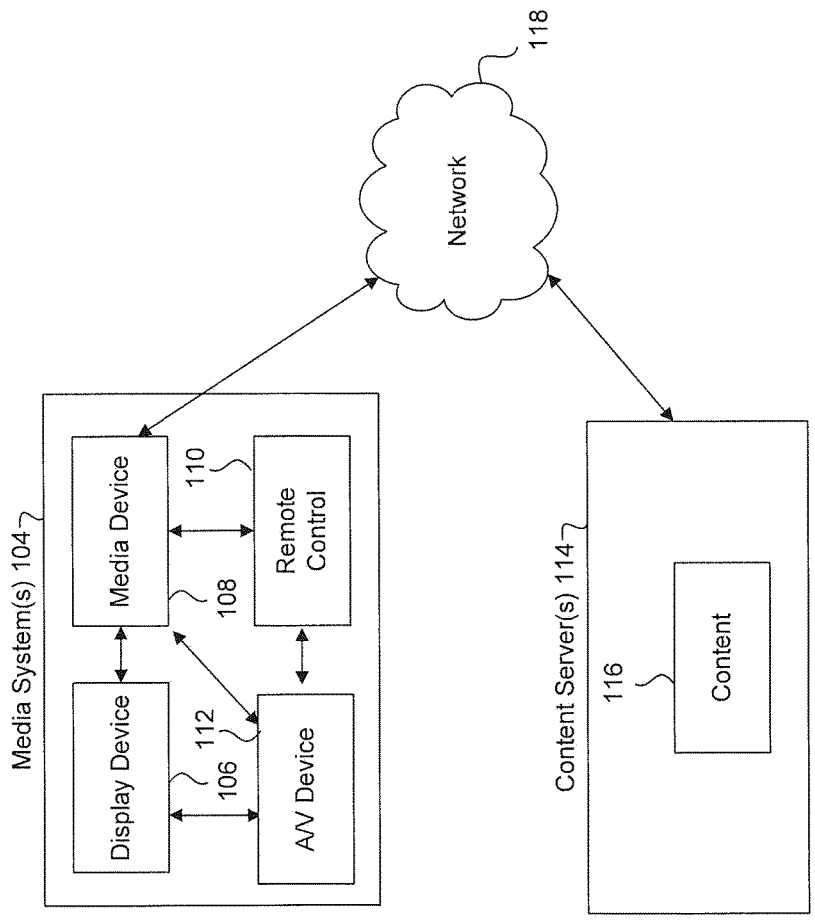
FIG. 1 illustrates a block diagram of a multimedia environment that includes one or more media systems and one or more content servers, according to some embodiments.

FIG. 1 illustrates a block diagram of a multimedia environment 102, according to some embodiments. In a non-limiting example, multimedia environment 102 is directed to streaming media.

The multimedia environment 102 may include one or more media systems 104 and one or more content servers 114 communicatively coupled via a network 118. In various embodiments, the network 118 can include, without limitation, wired and/or wireless intranet, extranet, Internet, cellular, Bluetooth and/or any other short range, long range, local, regional, global communications network, as well as any combination thereof.

In an embodiment, media system 104 includes a display device 106, media device 108, remote control 110, and audiovisual (A/V) device 112. Although only one media device is illustrated within media system 104, a person of ordinary skill in the art would understand that media system 104 may comprise more than one media device.

Display device 106 may be implemented as, for example, a monitor, television, computer, smart phone, tablet, and/or projector. Display device 106 may support 4K or 4K HDR, for example. Display device 106 may include any number of ports for receiving video content. Depending on the type and/or age of display device 106, these ports may be implemented as different HDMI ports such as an HDMI 1.4 port, an HDMI 2.0 port, HDMI Audio Return Channel (ARC) port, an HDMI Mobile High-Definition Link port, or an HDMI Digital Video In (DVI) port, to name just a few examples. Media device 108 may be implemented as, for example, a streaming media device, DVD device, audio/video playback device, cable box, video game consoles, Blu-ray disc players, and/or digital video recording device. Media device 108 may include any number of ports for outputting video content. Depending on the type and/or age of media device 108, these ports may also be implemented as different HDMI ports as described above with regard to display device 106. In some embodiments, the media device 108 can be a part of, integrated with, operatively coupled to, and/or connected to display device 106. The media device 108 may be configured to communicate with network 118.

In an embodiment, A/V device 112 may be implemented within media system 104 for connecting display device 106 and media device 108. In an embodiment, more than one media device may be included in media system 104, and A/V device 112 may serve as a hub for receiving audio and video signals from multiple sources within media system 104. For example, A/V device 112 may be connected to display device 106 and the more than one media device within media system 104.

A user 101 may interact with media system 104 via remote control 110. Remote control 110 can be any component, part, apparatus or method for controlling media device 108, display device 106, and/or A/V device 112, such as a remote control, a tablet, laptop computer, smartphone, on-screen controls, integrated control buttons, or any combination thereof.

Content servers 114 (also called content sources) may each include databases to store content 116. Content 114 may include any combination of music, videos, movies, TV programs, multimedia, images, still pictures, text, graphics, gaming applications, advertisements, software, and/or any other content or data objects in electronic form.

Figure 2:
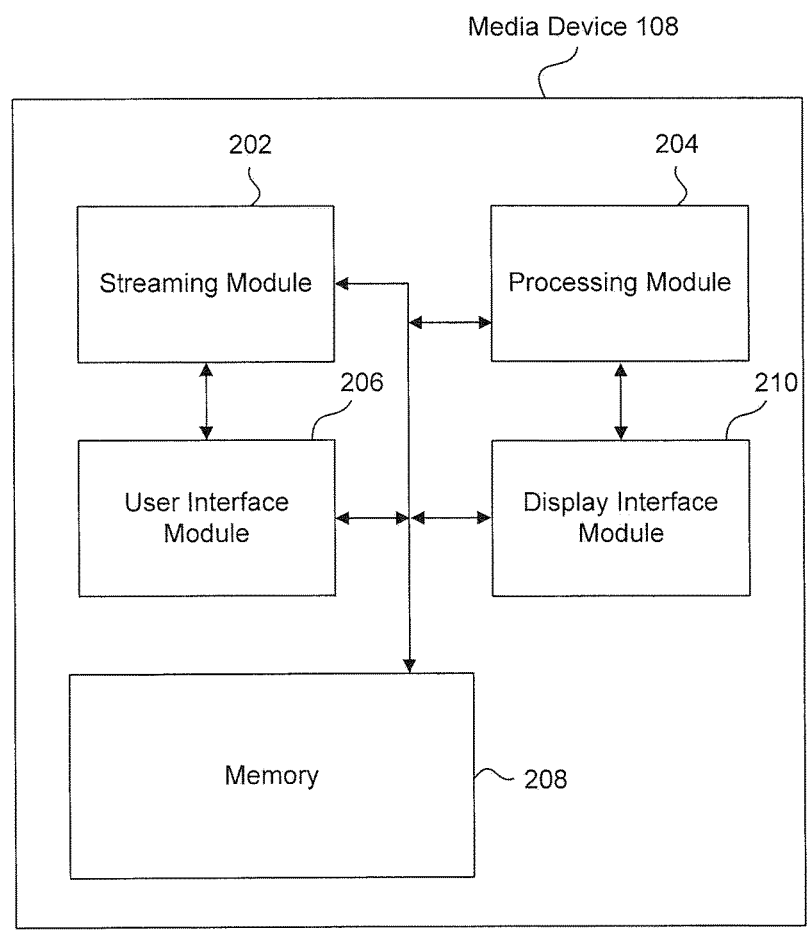
FIG. 2 illustrates a block diagram of an example media device, according to some embodiments.

FIG. 2 illustrates an example block diagram of the media device 108, according to some embodiments. Media device 108 may include a streaming module 202, processing module 204, user interface module 206, memory 208, and a display interface module 210.

Now referring to FIGS. 1 and 2, in some embodiments, a user may use remote control 110 to interact with the user interface module 206 of media device 108 to select content 116, such as a movie, TV show, music, book, application, game, to name just a few examples. The streaming module 202 of media device 108 may request the selected content 116 from content server(s) 114 over the network 118. Content server(s) 114 may transmit the requested content 116 to the streaming module 202. Media device 108 may transmit the received content to display device 106 for presentation to a user. In streaming embodiments, the streaming module 202 may transmit the content to display device 106 in real time or near real time as it receives such content 116 from content server(s) 114. In non-streaming embodiments, media device 108 may buffer or store the content 116 received from content server(s) 114 in memory 208 for later playback on display device 106.

In some embodiments, memory 208 also stores code or control logic that, when executed, causes processing module 204 to perform display diagnostics of a display device, and display interface module 210 of media device 108 may provide an interface between media device 108 and display device 106. For example, in an embodiment, media device 108 may be external to display device 106 and connected to a port of display device 16 through display interface module 210 by, for example, a physical cable or a wireless connection. In another embodiment, media device 108 may be a component of display device 106 and is connected to other components of display device 106 through display interface module 210 by, for example, a physical bus. In some embodiments, memory 208 may also store predetermined informational messages that can be retrieved and displayed on the display device based on the results of the display diagnostics.

In some embodiments, content server(s) 114 may also include code for performing display diagnostics remotely from media device 108. In such an embodiment, content server(s) 114 may receive information for performing display diagnostics from media device 108. Upon receiving the information, content server(s) 114 may perform display diagnostics and return the results of the display diagnostics for display on media device 108. In another embodiment, another external server separate from content server(s) 114 may include code for performing display diagnostics.

In some embodiments, display diagnostics include automatically (with little or no user input) detecting and determining the display capabilities of the display device based on the display device's input ports, processing the detected information from the display device, and providing information and/or a recommendation to the user regarding the display settings of the display device. In an embodiment, the recommendation specifies the display settings of the media device connected to the display device which determines the quality of the content provided by the media device to the display device. The recommended display settings are intended to improve or even optimize the performance of the display device without requiring the user to conduct a trial-and-error approach to determine what settings are appropriate based on the devices within media system 104. As one non-limiting example, if the media device detects that the display device is capable of displaying 4K UHD HDR video content, the media device may recommend adjusting the displaying settings of the media device to provide such content (and not 720p content) to the display device.

An example of detecting the display capabilities includes detecting the types of ports of the display device. For example, if the display diagnostics receives an indication from display device that the display device has an HDMI 1.4 port, media device 108 may process the indication by determining that the display device is capable of display 4K video content but only at 30 frames per second and provide this information to the user on the display device. In other embodiments, code for display diagnostics may be stored in a memory (not shown) of display device 106. Accordingly, in this embodiment, display device 106 may directly execute display diagnostics.

Figure 3:
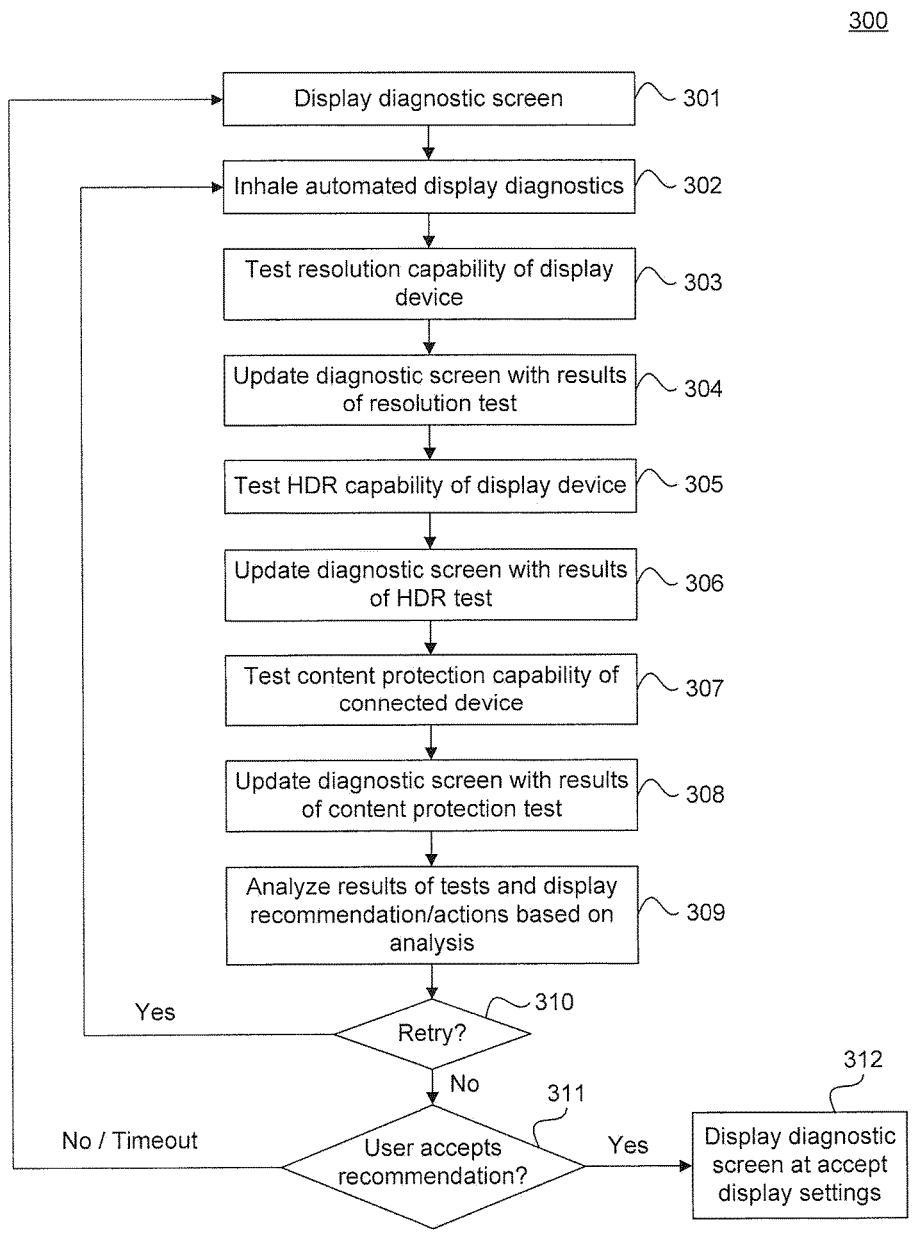
FIG. 3 is a flowchart for performing display diagnostics, according to some embodiments.

FIG. 3 illustrates a flowchart for performing automated display diagnostics of a display device, according to some embodiments. As one non-limiting example with regard to FIG. 2, the steps of method 300 shown in FIG. 3 may be performed by media device 108 to determine the display capabilities of display device 106. In such an embodiment, media device 108 may execute code in memory 208 to perform method 300 of FIG. 3. While method 300 of FIG. 3 will be discussed below as being performed by media device 108, other devices including display device 106 may store the display diagnostics code and therefore may execute method 300 by directly executing the code. For example, in some embodiments, an external server, such as content server(s) 114, may store display diagnostics code for executing method 300. The following discussion of method 300 will refer to devices of FIG. 1 as an exemplary non-limiting embodiment of method 300.

According to some embodiments, display diagnostics includes the display of a graphical user interface (GUI) on a display device, such as display device 106. Accordingly, at step 301, display diagnostics of display device 106 begins by displaying a diagnostic screen on display device 106. In some embodiments, diagnostic screen conveys actions to be performed by a media device, such as media device 108, that may be initiated by a user such as automated display diagnostics of display device 106.

At step 302, media device 108 receives input from the user indicating that automated display diagnostics are to be performed by media device 108. In response to receiving the input, media device 108 may execute appropriate code located in memory associated with the automated display diagnostics.

Automated display diagnostics continue at step 303 by testing the resolution capability of display device 106. Resolution refers to the number of pixels that compose the image on display device 106. Examples of resolutions for display devices, such as display device 106, include 720p, 1080p, 4K UHD, and 4K UHD HDR, to name just a few examples. At step 303, the resolution test may include receiving signals from display device 106 that indicate the resolution of the display for display device 106. For example, if display device 106 is capable of displaying 4K UHD or 4K UHD HDR, then display device 106 also provides signals indicating its frame rate capability. For example, as discussed above, display device 106 may provide information indicating that it has an HDMI 1.4 port and an HDMI 2.0 port. Media device 108 receives this information, processes the information by determining that the HDMI 1.4 port is only capable of displaying 4K video content at 30 frames per second while the HDMI 2.0 port is capable of displaying such content at 60 frames per second. Accordingly, in some embodiments, the display diagnostics will determine the capabilities of display device 106 by determining the type of HDMI port to which media device 108 is connected.

At step 304, media device 108, executing the display diagnostics, updates the diagnostic screen based on the results of the resolution test performed at step 303. In an embodiment, during execution of the resolution test, media device 108 updates the display with an icon informing the user that the resolution test is in progress. When execution of the resolution test is complete, media device 108 may update the display again with another icon informing the user of the completion and/or results of the resolution test. In addition or alternatively, media device 108 may provide a summary of the results. In an embodiment, updating the diagnostic screen may include determining a recommendation directed to the display settings, such as the resolution, of display device 106 and providing the recommendation on the display of display device 106.

Then, at step 305, media device 108 executes the HDR test of display diagnostics, which tests the HDR capability of display device 106. HDR refers to a display device's capability of displaying a wider range of colors such as brighter whites and darker blacks. The wider range of colors allows display devices to display details in the darkest and brightest areas of video that are lost in non-HDR display devices. In addition to determining whether display device 106 is HDR-capable, the HDR test also determines the frame rate supported by an HDR-capable device. For example, some HDR-capable display devices may only support 4K HDR at 30 frames per second while others support 60 frames per second. In general, the display diagnostics may determine the HDR capabilities of display device 106 by determining the type of HDMI port to which media device 108 is connected. Providing this information to the user may be important because some media providers may only stream 4K HDR content if the HDR-capable display device supports 4K HDR at 60 frames per second.

At step 306, media device 108 updates the diagnostic screen based on the results of the HDR test performed at step 304. In an embodiment, during execution of the HDR test, media device 108 updates the display with an icon informing the user that the HDR test is in progress. When execution of the HDR test is complete, media device 108 may update the display again with another icon informing the user of the completion and/or results of the HDR test. In addition or alternatively, media device 108 may provide a summary of the results. In an embodiment, updating the diagnostic screen may include updating the recommendation that was initially determined in step 304 and is directed to the display settings of display device 106. Updating the recommendation may include retrieving a predetermined message or information based on the results of the HDR test and providing the updated recommendation on the display of display device 106.

Next, at step 307, media device 108 executes the content protection test of display diagnostics, which tests the content protection capability of display device 106. Content protection, such as HDCP, generally is designed to prevent copying of digital audio and video content as it travels across a connection, such as an HDMI port. Certain types of video content require certain versions of content protection. For example, 4K video content may require a display device to support HDCP 2.2. Display devices that only support HDCP 1.4 may not be able to display 4K video content.

At step 308, media device 108 updates the diagnostic screen based on the results of the content protection test performed at step 304. In an embodiment, during execution of the content protection test, media device 108 updates the display with an icon informing the user that the test is in progress. When execution of the test is complete, media device 108 may update the display again with another icon informing the user of the completion and/or results of the test. In addition or alternatively, media device 108 may provide a summary of the results. In an embodiment, updating the diagnostic screen may include updating the recommendation directed to the display settings such as the resolution and/or HDR capability of display device 106. Updating the recommendation may include retrieving a predetermined message or information based on the results of the content protection test and providing the updated recommendation on the display of display device 106.

At step 309, after completion of the resolution, HDR, and content protection tests as described above and collecting the necessary information from display device 106, display diagnostics may further analyze the information and the results of the tests to provide a summary of the capabilities of display device 106, update a recommendation as to the appropriate display settings for display device 106, and/or an action that the user may perform such as suggestions for changing a configuration of media system 104. In another embodiment, display device 106 may transmit the information to an external server for further analysis. In such an embodiment, display diagnostics may be installed on the external server and may perform the analysis of the information. After completion of the analysis, the external may provide the summary of the capabilities of display device 106 to display device 106.

Display diagnostics may display the summary, recommendation, and/or action on display device 106 for viewing by the user. In an embodiment, the recommendation indicates that media device 108 should provide 4K UHD HDR content to display device 106. In an embodiment, media device 108 may determine the appropriate recommendation by retrieving predetermined messages either stored locally in media device 108 or retrieved over a network from content server 114. As one non-limiting example, if media device 108 determines that display device 106 is capable of displaying 4K HDR content at 60 frames per second and implements HDCP 2.2, media device 108 may retrieve a predetermined message informing the user that media device 108 and/or display device 106 may be set to a 4K UHD HDR setting. In another embodiment, the message may be generated dynamically based on the information provided to media device 108.

After viewing the information provided by display diagnostics, the user may decide to change a configuration of media system 104. For example, the user may change the input port of display device 106 into which media device 108 is connected. At step 310, media device 108 determines whether the user wishes to retry the automated display diagnostics. If so, media device 108 executes the code for automated display diagnostics and restarts the method 300 at step 302. If not, media device 108 determines whether the user accepts a recommendation provided by display diagnostics at step 311. If not, or if media device 108 does not receive a response from the user within a predetermined time period, media device 108 does not implement the recommended display settings and returns to the diagnostic screen at the original settings at step 301. However, if the user does accept the recommendation, then at step 312, media device 108 implements the recommended display settings and displays the diagnostic screen at the accepted settings.

Figure 4:
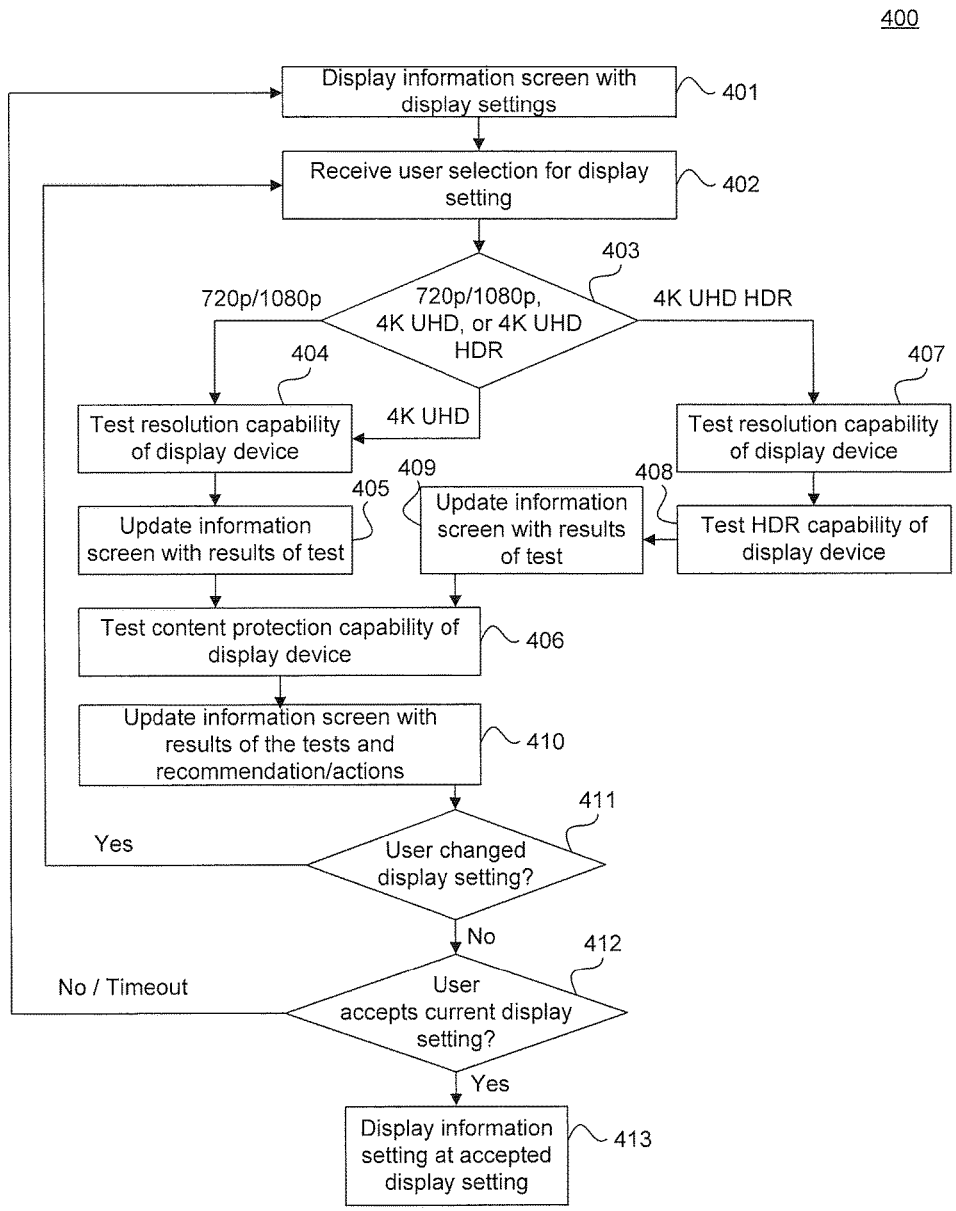
FIG. 4 is a flowchart for performing display diagnostics based on a user-initiated change to the display settings of a media device or display device, according to some embodiments.

FIG. 4 illustrates a flowchart for performing display diagnostics of a display device, such as display device 106, based on a user-initiated change to the display settings of a media device, such as media device 108, or display device 106, according to some embodiments. As one non-limiting example with regard to FIG. 2, the steps of method 400 shown in FIG. 4 may be performed by media device 108 to determine the display capabilities of display device 106. In such an embodiment, media device 108 executes code in memory 208 to perform method 400 of FIG. 4. While method 400 of FIG. 4 will be discussed below as being performed by media device 108, other devices including display device 106 may store the display diagnostics code in a memory and therefore also execute method 400. For example, in some embodiments, an external server, such as content server(s) 114, store display diagnostics code for executing method 400. The following discussion of method 400 will refer to devices of FIG. 1 as an exemplary embodiment of method 400.

In some embodiments, method 400 illustrates steps performed when a user manually changes a display setting on media device 108 or display device 106. At step 401, media device 108 displays an information screen providing details of the display settings of display device 106. In some embodiments, the Display Setting screen conveys different settings at which media device 108 may provide video content. Non-limiting examples of settings include 720p, 1080p, 4K UHD, and 4K UHD HDR.

At step 402, media device 108 receives the user's manually selected option for the display setting. As discussed above, in some embodiments, this option may include 720p, 1080p, 4K UHD, and 4K UHD HDR. Other options may be possible including future display settings that require determining the resolution, HDR, and content protection capabilities of the display device. At step 403, media device 108 determines the user selected option.

If the user manually selected 720p/1080p or 4K UHD as the display option, media device 108 proceeds to step 404 where media device 108 executes display diagnostics code for the resolution test. In particular, display diagnostics tests the resolution capability of display device 106 to determine whether the user selected option is capable with the actual resolution capability of display device 106. The resolution test may include receiving signals from display device 106 that indicate the resolution of display device 106. Moreover, if display device 106 is capable of displaying 4K UHD, then display device 106 may also provide signals indicating the frame rate capability of display device 106. For example, as discussed above, display device 106 may provide information regarding the type of HDMI ports (e.g., HDMI 1.4, HDMI 2.0). Media device 108 collects this information and processes it to determine the capabilities of display device 106.

At step 405, media device 108, after processing the information collected from display device 106, updates the information screen to provide to the user an indication of the results of the test performed at step 404. In an embodiment, during execution of the resolution test, media device 108 updates the display with an icon informing the user that the resolution test is in progress. When execution of the resolution test is complete, media device 108 may update the display again with another icon informing the user of the completion and/or results of the resolution test. In addition or alternatively, media device 108 may provide a summary of the results. In an embodiment, updating the information screen may include determining a recommendation directed to the display settings, such as the resolution, of display device 106 and providing the recommendation on the display of display device 106.

Next, at step 406, media device 108 executes display diagnostics code for the content protection test, which tests the content protection capability of display device 106. Examples of content protection for video content include HDCP 1.4 and HDCP 2.2 although the disclosure is not limited to these examples. At step 410, media device 108 updates the information screen based on the results of the content protection test performed at step 304. In an embodiment, during execution of the content protection test, media device 108 updates the display with an icon informing the user that the test is in progress. In an embodiment, updating the information screen may include updating the recommendation that was initially determined in step 405 and is directed to the display settings of display device 106. Updating the recommendation may include retrieving a predetermined message or information based on the results of the content protection test and providing the updated recommendation on the display of display device 106. When execution of the test is complete, media device 108 may update the information screen again with another icon informing the user of the completion and/or results of the test. In addition or alternatively, media device 108 may provide a summary of the results.

At this point, also in 410, if the user has selected 720p/1080p or 4K UHD as a display setting, media device 108 may proceed with analyzing the results of the resolution test and the content protection test in order to provide a recommendation regarding the user's selection. For example, if the user has selected 4K UHD but the display diagnostics have determined that the resolution of display device 106 is 720p or 1080p, the display diagnostics will provide a recommendation that media device 108 or display device 106 should be set accordingly.

In another embodiment, media device 108 provides the results of the resolution test and the content protection test to an external server. In such an embodiment, display diagnostics may be installed on the external server. The display diagnostics on the external server may analyze the results of the resolution test and generate a recommendation. The external server may then provide the recommendation for display on media device 108.

Returning back to step 403, if the user has selected 4K UHD HDR, media device 108 proceeds to step 407 where media device 108 executes display diagnostics code for the resolution test as described above with regard to step 404. At step 408, media device 108 further performs an HDR test to determine the HDR capabilities of display device 106. In addition to determining whether display device 106 is HDR-capable, the HDR test also determines the frame rate supported by an HDR-capable device. For example, some HDR-capable display devices may only support 4K HDR at 30 frames per second while others support 60 frames per second. In general, the display diagnostics will determine the HDR capabilities of display device 106 by determining the type of HDMI port to which media device 108 is connected.

At step 409, media device 108 updates the information screen based on the results of the HDR test. In an embodiment, during execution of the HDR test, media device 108 updates the display with an icon informing the user that the HDR test is in progress. When execution of the HDR test is complete, media device 108 may update the display again with another icon informing the user of the completion and/or results of the HDR test. In addition or alternatively, media device 108 may provide a summary of the results. In an embodiment, updating the diagnostic screen may include updating the recommendation from previous steps and is directed to the display settings of display device 106. Updating the recommendation may include retrieving a predetermined message or information based on the results of the HDR test and providing the updated recommendation on the display of display device 106. Media device 108 then proceeds to step 406 to test the content protection capability of display device 106, which was described above. Step 410 is similar to the scenario performed when the user selects 720p/1080p or 4K UHD except media device 108 includes the results of the HDR test in its analysis when providing a recommendation to the user.

At step 411, media device 108 determines whether the user has changed another display setting or if the user has indicated that he has changed a physical configuration of media system 104 (e.g., changing the HDMI port into which media device 108 is plugged). If the user has changed one or more display settings, then media device 108 repeats method 400 starting at step 402 based on the changed display setting or the updated physical configuration. If not, then in step 412 media device 108 determines whether the user accepts the current display setting. If not or if the user does not respond (i.e., times out), media device 108 returns to step 401 and displays the information screen at the original display setting. If yes, then at step 413, media device 108 displays the information screen at the accepted display setting.

Example Computer System

Figure 5:
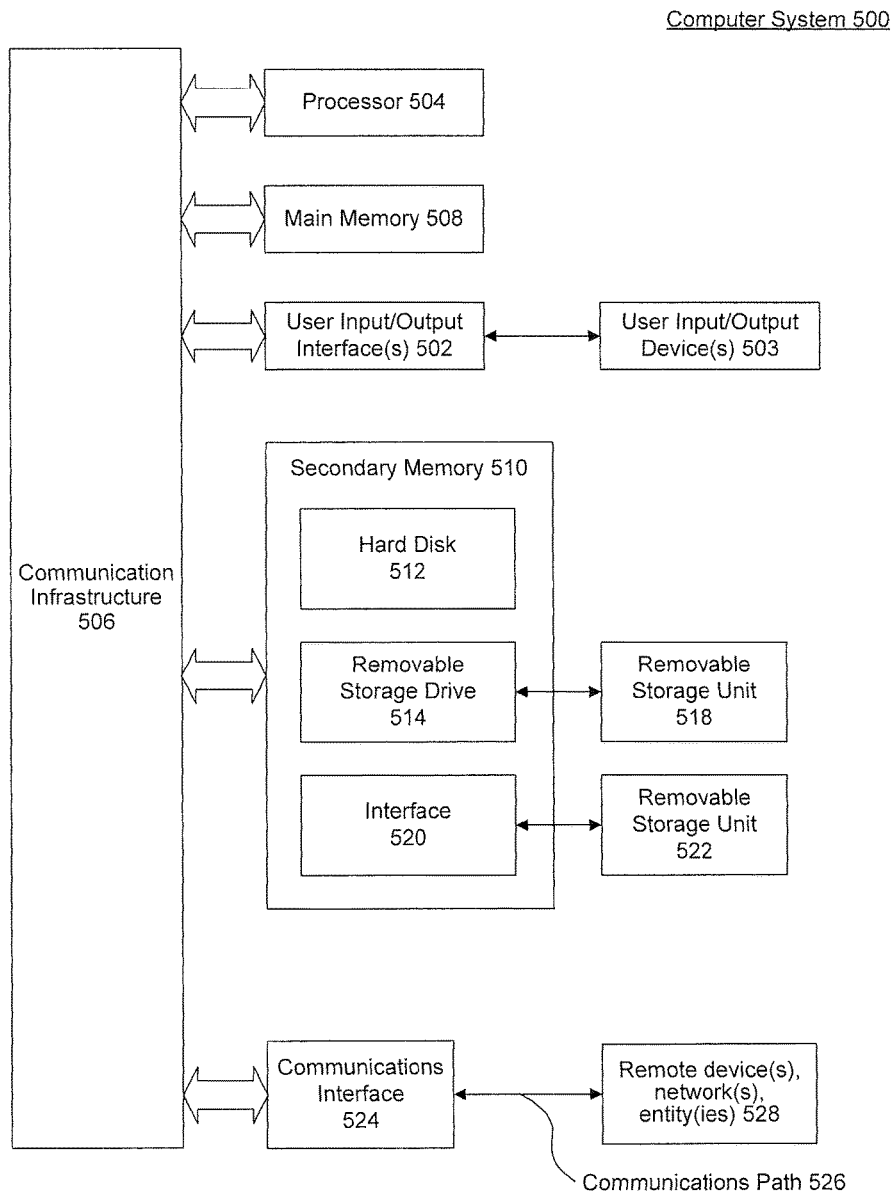
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 can be used to implement any embodiments of FIGS. 1-4, and/or any combination or sub-combination thereof.

Computer system 500 includes one or more processors (also called central processing units, or CPUs), such as a processor 504. Processor 504 is connected to a communication infrastructure or bus 506.

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device, comprising:
   a display interface configured to communicate with a display device;
   a processor; and
   a memory operatively coupled to the processor, the memory configured to store program code that when executed causes the processor to perform operations comprising:
      receiving a user selection associated with a display setting of the display device, wherein the display setting includes a resolution of the display device;
      determining whether the user selection includes a high-dynamic range (HDR) selection or a non-HDR selection;
      responsive to the user selection including the HDR selection;
         performing a resolution capability test and an HDR capability test;

in response to performing the resolution capability test and the HDR capability test, updating a diagnostic screen that is displayed on the display device based on first results of performing the resolution capability test and the HDR capability test;

after performing the resolution capability test and the HDR capability test, performing a content protection capability test; and in response to performing the content protection capability test, updating the diagnostic screen based on second results of performing the content protection capability test; and determining, based on the first and second results, a display setting recommendation, wherein the display setting recommendation comprises a second display setting associated with the display device.

2. The media device of claim 1, wherein the determining the display setting recommendation comprises retrieving a predetermined message from the memory of the media device.

3. The media device of claim 1, wherein the second results comprise content protection information generated in response to performing the content protection capability test, and wherein the operations further comprise updating, based on the content protection information, the display setting recommendation.

4. The media device of claim 1, wherein the first results comprise HDR information generated in response to performing the HDR capability test, and wherein the operations further comprise updating, based on the HDR information, the display setting recommendation.

5. The media device of claim 1, wherein the first results comprise resolution information generated in response to performing the resolution capability test of the display device, and wherein the operations further comprise updating, based on the resolution information, the display setting recommendation.

6. The media device of claim 1, wherein the operations further comprise:

receiving a second user selection associated with the display setting recommendation; and adjusting the display setting associated with the display device.

7. The media device of claim 1, wherein the user selection includes at least one of a 4K UHD selection and a 4K UHD HDR selection.

8. A computer implemented method performed by a media device, the method comprising:

receiving a user selection related to a display setting, wherein the display setting is associated with a resolution of a display device;

determining whether the user selection includes a high-dynamic range (HDR) selection or a non-HDR selection;

responsive to the user selection including the HDR selection:

performing a resolution capability test and an HDR capability test;

collecting, from the display device, first results in response to performing the resolution capability test and the HDR capability test;

after collecting the first results, receiving second results in response to performing a content protection capability test of the display device; and generating updated test information based on the collected first and second results;

determining, based on the updated test information, a display setting recommendation, wherein the display setting recommendation comprises a second display setting associated with the display device; and displaying the display setting recommendation on the display device.

9. The method of claim 8, wherein the determining the display setting recommendation comprises retrieving a predetermined message from a memory of the media device.

10. The method of claim 8, wherein the second results comprise content protection information in response to performing the content protection capability test and wherein the method further comprises updating, based on the content protection information, the display setting recommendation.

11. The method of claim 8, wherein the first results comprise HDR information in response to performing the HDR capability test and wherein the method further comprises updating, based on the HDR information, the display setting recommendation.

12. The method of claim 8, wherein the second results comprise resolution information in response to performing the resolution capability test and wherein the method further comprises updating, based on the resolution information, the display setting recommendation.

13. The method of claim 8, further comprising:

receive a second user selection associated with the display setting recommendation; and adjusting the display setting associated with the display device.

14. The method of claim 8, wherein the user selection includes at least one of a 4K UHD selection and a 4K UHD HDR selection.

15. A non-transitory, tangible computer-readable device having instructions stored thereon that, when executed by at least one computing device, cause the at least one computing device to perform operations comprising:

receiving a user selection related to a display setting, wherein the display setting is associated with a resolution of a display device;

determining whether the user selection includes a high-dynamic range (HDR) selection or a non-HDR selection;

responsive to the user selection including the HDR selection:

performing a resolution capability test and an HDR capability test;

collecting, from the display device, first results in response to performing the resolution capability test and the HDR capability test;

after collecting the first results, receiving second results in response to performing a content protection capability test of the display device; and generating updated test information based on the collected first and second results;

determining, based on the updated test information, a display setting recommendation, wherein the display setting recommendation comprises a second display setting associated with the display device; and displaying the display setting recommendation on the display device.

16. The non-transitory, tangible computer-readable device of claim 15, wherein the test information comprises content protection information in response to performing the content protection capability test and wherein the operations further comprise updating, based on the content protection information, the display setting recommendation.

17. The non-transitory, tangible computer-readable device of claim 15, wherein the test information comprises HDR information in response to performing the HDR capability test of the display device and wherein the operations further comprise updating, based on the HDR information, the display setting recommendation.

18. The non-transitory, tangible computer-readable device of claim 15, wherein the test information comprises resolution information in response to performing the resolution capability test of the display device and wherein the operations further comprise updating, based on the resolution information, the display setting recommendation.

19. The non-transitory, tangible computer-readable device of claim 15, the operations further comprising:
  receive a second user selection associated with the display setting recommendation; and
  adjusting the display setting associated with the display device.

20. The non-transitory, tangible computer-readable device of claim 15, wherein the user selection includes at least one of a 4K UHD selection and a 4K UHD HDR selection.

\* \* \* \* \*